G. H. ALEXANDER AND R. J. NASH.
LIQUID LEVEL GAGE FOR STORAGE TANKS AND THE LIKE.
APPLICATION FILED SEPT. 17, 1918.

1,330,047.

Patented Feb. 10, 1920.

Inventors
G. H. Alexander
R. J. Nash
By H. R. Kerslake
Atty.

UNITED STATES PATENT OFFICE.

GEORGE HENRY ALEXANDER AND ROBERT JOHN NASH, OF BIRMINGHAM, ENGLAND, ASSIGNORS TO THE A-N COMPANY LIMITED, OF BIRMINGHAM, ENGLAND.

LIQUID-LEVEL GAGE FOR STORAGE-TANKS AND THE LIKE.

1,330,047.

Specification of Letters Patent.

Patented Feb. 10, 1920.

Application filed September 17, 1918. Serial No. 254,436.

*To all whom it may concern:*

Be it known that we, GEORGE HENRY ALEXANDER, engineer, residing at 83–4, Coleshill street, in the city of Birmingham, England, and ROBERT JOHN NASH, engineer, residing at 107 Bristol road, in the city of Birmingham, England, subjects of the King of Britain and Ireland, have invented certain new and useful Improvements Relating to Liquid-Level Gages for Liquid-Storage Tanks and the like, of which the following is a specification.

This invention relates to fluid gages for liquid storage tanks and the like and particularly for petrol or liquid fuel storage tanks such as are employed on motor cars, the gages being of the type in which the gage fluid is separated from the liquid in the tank by a region of entrapped air.

The object of the invention is to facilitate the setting of the gages to suit tanks of varying depths.

The invention comprises the combination with a gage tube, of a liquid seal which by inclining it or otherwise is adjustable in such a manner that a fixed range of movement of the liquid level in the gage tube can be utilized to indicate a rise and fall of level in tanks of different depths.

In the accompanying sheet of explanatory drawings:—

Figure 1:
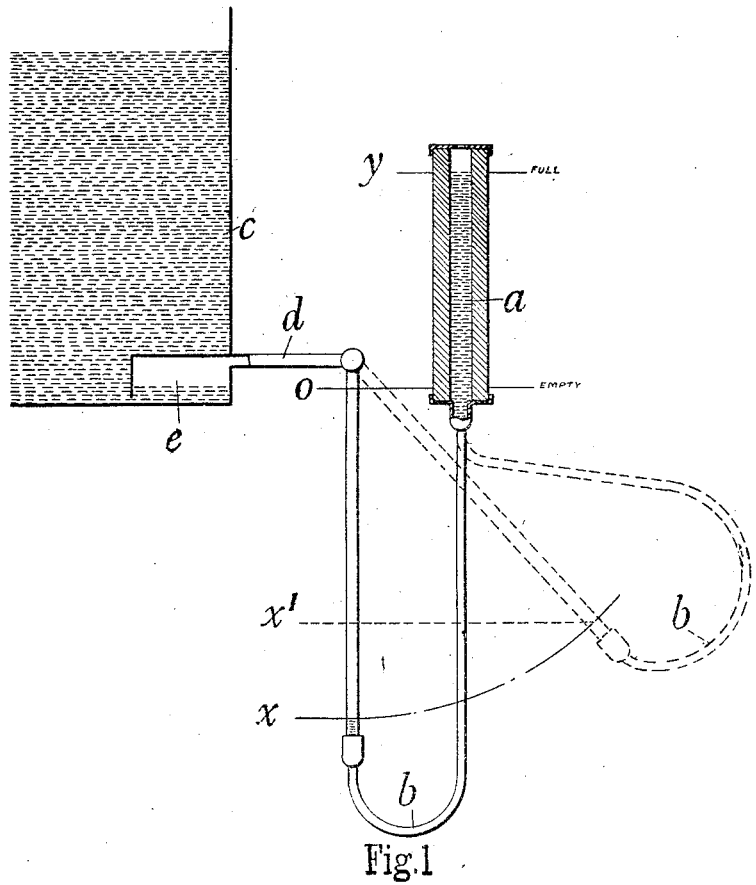
Figure 2:
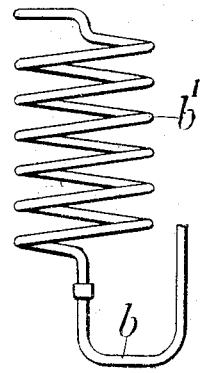

Figures 1 and 2 are diagrams illustrating two ways of carrying the invention into effect.

Referring to Fig. 1, the gage glass or tube $a$ is, when applied to a motor car, attached to the dash or other convenient part of the car in any ordinary manner. The length of the gage between the limits $o.y.$ is such as to accommodate the liquid displaced from the seal $b$ by the pressure head in a tank $c$ of a given maximum depth when the said tank is filled with petrol. Under such conditions the seal, which is equivalent to a U-tube, has its two arms disposed vertically, the said arms being of such length that the seal liquid is not forced entirely from that arm to which the entrapped air, between the seal and the tank, has access, there being sufficient liquid at the bottom of the said arm, after the displacement effected by the head due to a full tank, to maintain the seal. In the particular arrangement shown when the tank is empty the level in both arms of the seal lies at the zero line shown in the diagram. When the tank is filled the liquid in the left hand arm is depressed to $x$, and the level in the gage tube at the top of the right hand arm rises to $y$. The volume of liquid displaced from $o$ to $x$ is equal to the volume transferred to the region $o$ to $y$.

The right-hand arm of the U-tube is made of flexible material, while the left hand arm consists of a rigid tube pivoted on the branch $d$ communicating with an air chamber $e$ open at its under side to the interior of the tank. When the gage is applied to a shallower tank for which the total vertical movement of the liquid in the left hand arm of the seal is less than $o$ $x$ it is clear that with the arms of the U-tube in the position shown by full lines the level in the gage tube will not rise to $y$, and the full range of the gage tube will not be utilized. To enable the level to rise to $y$ the arms of the U-tube are swung to a position such as that shown by dotted lines in which $y$ $x^1$ corresponds to the maximum head in the tank and the seal is secured in such position. The total displacement from the left hand to the right hand tube is still the same as before, but the levels are different as already stated. The full range of the gage tube will now be utilized for indicating a smaller total fall of level in the tank than in the first case described. Any angular adjustment between the horizontal and vertical positions can be provided and consequently the same tube $a$ can be applied to tanks of widely varying depths.

The invention is not limited to any particular means for adjusting the seal. For example instead of a hinged tube as shown in Fig. 1, a flexible spiral tube $b^1$ may be used. At its upper end it is connected to a tank air chamber and at its lower end by a flexible tube to the gage. Adjustment to suit varying tank depths is obtained by extending or shortening the over all length of the spiral. The effect is the same as that above described in that a constant range of movement of the fluid level in $a$ can be maintained for a variety of vertical movements of the level in $c$. By this invention a standardized gage tube can be used with practically any tank. With a non-adjustable seal the movement in the gage tube would vary with tanks of different depths and different gage tubes would be required for different tanks. Our invention enables the same gage tube to be employed on any tank within the limits of variation ordinarily found.

Having thus described our invention what we claim as new and desire to secure by Letters Patent is:—

1. In fluid level gages for liquid storage tanks of that type in which the gage fluid is separated from the liquid in the tank by a region of entrapped air, comprising in combination a gage tube, an entrapped air chamber, a liquid containing seal tube of substantially U shaped configuration connecting the gage tube and air chamber and depending below the air chamber and gage tube, and said seal tube being in part rigid and in part flexible and adjustable, substantially as described.

2. In fluid level gages for liquid storage tanks and the like, of the type in which the gage fluid is separated from the liquid in the tank by a region of entrapped air, the combination comprising a gage tube, an entrapped air chamber, a liquid seal tube connecting the gage tube and air chamber, said seal tube being in part rigid and in part flexible, the rigid part being pivoted and arranged in immediate conjunction with the air chamber, substantially as described.

In testimony whereof we have signed our names to this specification.

GEORGE HENRY ALEXANDER.
ROBERT JOHN NASH.